United States Patent
Lin et al.

(10) Patent No.: US 7,522,220 B2
(45) Date of Patent: Apr. 21, 2009

(54) DUAL-CHANNEL ADAPTIVE 2D NOISE REDUCTION FOR VIDEO SIGNALS

(75) Inventors: Peng Lin, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 535 days.

(21) Appl. No.: 11/094,942

(22) Filed: Mar. 30, 2005

(65) Prior Publication Data

US 2006/0221249 A1 Oct. 5, 2006

(51) Int. Cl.
G06K 9/40 (2006.01)
H04N 5/00 (2006.01)
H04N 5/21 (2006.01)

(52) U.S. Cl. ........................ 348/607; 348/625; 382/261

(58) Field of Classification Search ................ 348/606, 348/607, 625; 382/261
See application file for complete search history.

(56) References Cited

U.S. PATENT DOCUMENTS

| | | | | |
|---|---|---|---|---|
| 5,097,321 A * | 3/1992 | Stern et al. ................. 348/450 |
| 5,384,869 A * | 1/1995 | Wilkinson et al. .......... 382/240 |
| 5,461,655 A | 10/1995 | Vuylsteke et al. ........... 378/901 |
| 5,526,446 A | 6/1996 | Adelson et al. ............. 382/275 |
| 5,534,927 A * | 7/1996 | Shishikui et al. .......... 348/400.1 |
| 5,903,680 A * | 5/1999 | De Haan et al. ............. 382/265 |
| 5,920,652 A * | 7/1999 | Wilkinson .................. 382/260 |
| 6,229,929 B1 * | 5/2001 | Lynch et al. ................ 382/268 |
| 6,281,942 B1 * | 8/2001 | Wang ......................... 348/607 |
| 6,381,279 B1 * | 4/2002 | Taubman ................ 375/240.18 |
| 6,771,320 B2 * | 8/2004 | Choi ........................... 348/625 |
| 6,823,086 B1 * | 11/2004 | Dolazza ...................... 382/261 |
| 6,847,738 B1 * | 1/2005 | Scognamiglio et al. ..... 382/260 |
| 7,009,662 B2 * | 3/2006 | Ojo et al. .................... 348/625 |
| 7,016,549 B1 * | 3/2006 | Utagawa ..................... 382/261 |
| 7,061,546 B2 * | 6/2006 | Wischermann .............. 348/571 |
| 7,110,044 B2 * | 9/2006 | Wang et al. ................. 348/627 |
| 7,139,036 B2 * | 11/2006 | Wang et al. ................. 348/625 |
| 7,158,189 B2 * | 1/2007 | Alvarez ...................... 348/618 |
| 7,199,838 B2 * | 4/2007 | Lin et al. .................... 348/607 |
| 7,212,686 B2 * | 5/2007 | Someya et al. .............. 382/263 |
| 7,228,002 B2 * | 6/2007 | Macy, Jr. .................... 382/260 |
| 2002/0076117 A1 * | 6/2002 | Allred et al. ................ 382/261 |

* cited by examiner

*Primary Examiner*—Brian P Yenke
(74) *Attorney, Agent, or Firm*—Kenneth L. Sherman, Esq.; Michael Zarrabian, Esq.; Myers Andras Sherman LLP

(57) ABSTRACT

A noise reduction system that not only preserves details in images but also provides essentially clean, smooth, and natural looking homogeneous regions in images. The noise reduction system utilizes a dual-channel adaptive noise reduction technique. The input signal is first split into two channels (i.e., a low-pass channel and a high-pass channel), by a channel splitting filter. Then the two channel signals are processed separately. The low-pass channel signal is processed using an adaptive directional filter based on the estimation of the local 2D and 1D statistics and the detection of the local image structure direction. The high-pass channel signal is processed by a non-linear filtering method based on the estimation of the local statistics and the noise level of the high-pass channel signal, which is derived from the noise level of the original input signal. The processed signals from the two channels are summed together to get the final output.

32 Claims, 3 Drawing Sheets

DUAL-CHANNEL ADAPTIVE 2D NOISE REDUCTION FOR VIDEO SIGNALS

FIELD OF THE INVENTION

The present invention relates generally to image processing, and more particularly to spatial noise reduction for videos.

BACKGROUND OF THE INVENTION

Video signals are often corrupted by noise during acquisition or transmission processes. Noise is a major source of degradation in picture quality. As TV screens get ever larger, video noise has become more annoying to viewers. Therefore, there has been a need for high quality noise reduction systems to improve video quality.

Traditional 2-dimensional (2D) noise reduction methods mainly involve linear processing (filtering) in either spatial or spectrum domains. Such noise reduction is based on attenuating high frequency signals components which represent noise. However, while reducing noise by attenuating the high frequency components, such linear processing removes some important image details and causes image edge blurring.

In order to prevent image edge blurring, noise reduction filtering needs to be adaptive to image local structures. One such adaptive technique is known as directional filtering wherein a directional filter is used to avoid image blurring by adapting to image edge directions in such a way that the filter is always applied along the edge direction, not across the edge direction.

Although the directional filter does prevent some image edge blurring, a drawback is that noise residuals in homogeneous image regions tend to cluster around the noise outliers (especially for high noise) due to the local spatial operation nature of the algorithm. This often leaves the processed image appearing "dirty" in the homogeneous regions.

SUMMARY OF THE INVENTION

An object of the present invention is to provide a noise reduction method that not only preserves details in images but also provides an essentially clean, smooth, and natural looking homogeneous regions in images. Accordingly, in one embodiment, the present invention provides a noise reduction system utilizing a dual-channel adaptive noise reduction technique.

The input signal is first split into two channels (i.e., a low-pass channel and a high-pass channel), by a channel splitting filter. Then, the two channel signals are processed separately. The low-pass channel signal is processed using an adaptive directional filter based on the estimation of the local image 2D and 1D statistics and the detection of the local image structure direction. The adaptive directional filter switches between 2D filtering and 1D filtering based on the estimation of the local statistics and the noise level of the low-pass channel signal, which is derived from the noise level of the original input signal. In homogeneous image regions, 2D smoothing filtering is used to remove noise as much as possible. In the image structure region, 1D directional filtering is used to smooth the image along image structure directions.

The high-pass channel signal is processed by a non-linear filtering method based on the estimation of the local image statistics and the noise level of the high-pass channel signal, which is derived from the noise level of the original input signal. The processed signals from the low-pass channel and the high-pass channel are summed together to obtain the final noise-reduced output image. Such a noise reduction method according to the present invention not only preserves details of the input image, but also provides essentially clean, smooth, and natural looking homogeneous regions in the output image.

Other embodiments, features and advantages of the present invention will be apparent from the following specification taken in conjunction with the following drawings.

DETAILED DESCRIPTION OF THE INVENTION

Figure 1:
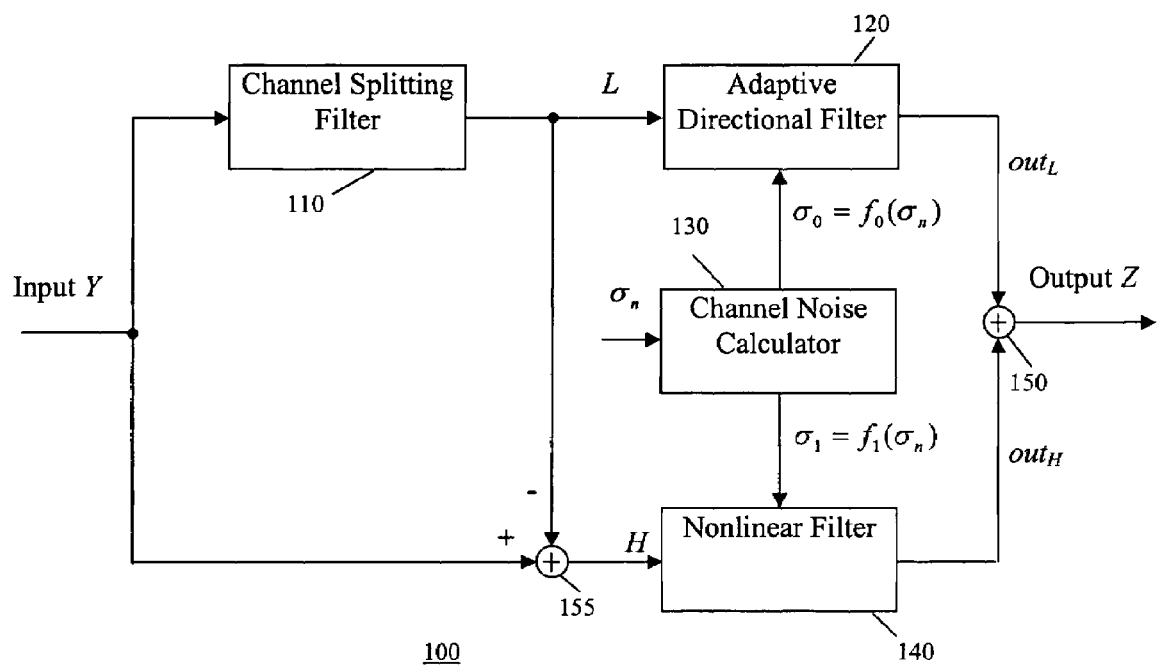
FIG. 1 shows a functional block diagram of a dual-channel adaptive 2D noise reduction system according to an embodiment of the present invention.

Referring to FIG. 1, a function block diagram of a dual-channel 2D adaptive noise reduction system 100 according to an embodiment of the present invention is shown. The digital input image signal comprises frames of pixels, wherein the input image pixels are first split into two channels (i.e., a low-pass channel L and the high-pass channel H), by a carefully designed channel splitting filter 110. Then the two channel signals L, H are processed separately.

The low-pass channel signal L is processed by an adaptive directional filter 120 based on the estimation of the local image 2D and 1D statistics, and the detection of the local image structure direction. The adaptive directional filter 120 switches between 2D filtering and 1D filtering based on the estimation of the local statistics and the noise level of the low-pass channel signal L, which is derived from the noise level of the original input signal using a channel noise calculator 130. In the homogeneous image regions, a 2D smoothing filter in the directional filter 120 is used to remove noise as much as possible. In the image structure region, a 1D directional filter in the directional filter 120 is used to smooth the image along image structure direction.

The high-pass channel signal H is processed by a nonlinear filter 140 based on the estimation of the local image statistics and the noise level of the high-pass channel signal, which is derived from the noise level of the original input signal. The processed signals from the low-pass and the high-pass channels are combined (e.g., summed) together at a combiner 150 to provide the noise-reduced output image.

The channel splitting filter 110 includes a splitting filter g to first split the input signal Y into the low-pass channel signal L and the high-pass channel signal H. The splitting filter g is designed in such a way that the corresponding high-pass signal H not only contains noise but also contains significant amount of image structures. One example of such splitting filter g is represented by a 3×3 filter in relation (1) below:

$$g_0 = \begin{bmatrix} 1/12 & 1/12 & 1/12 \\ 1/12 & 1/3 & 1/12 \\ 1/12 & 1/12 & 1/12 \end{bmatrix}. \quad (1)$$

The low-pass signal L is obtained by applying the splitting filter g to the input image signal Y, i.e., L=Y*g.

The high-pass signal H is obtained by subtracting the low-pass signal L from the input signal Y via a difference node 155, i.e., H=Y−L. From this construction of the low-pass signal L and the high-pass signal H, it can be seen that Y=L+H.

Once the input signal Y is split into the two channel signals L and H by the splitting filter 110, the noise level $\sigma_0$ of the low-pass channel and the noise level $\sigma_1$ of the high-pass channel are calculated by the channel noise calculator 130.

Generally, the channel noise levels are determined by the splitting filter 110 and the noise level of the input signal $\sigma_n$. As such, in general: $\sigma_0$ and $\sigma_1$ are functions of $\sigma_n$, i.e., $\sigma_0=f_0(\sigma_n)$ and $\sigma_1=f_1(\sigma_n)$. As an example, for the above-mentioned splitting filter, the channel noise levels can be calculated as: $\sigma_0=0.4\cdot\sigma_n$ and $\sigma_1=0.7\cdot\sigma_n$. The noise level of the input signal $\sigma_n$ is provided as a separate input to the system 100.

After the input signal is split into the low-pass channel signal L and the high-pass channel signal H, each channel is processed separately based on its own noise level. The low-pass channel signal L is processed by the adaptive directional filter unit 120, and the high-pass channel signal H is processed by the nonlinear processing unit 140.

Figure 2:
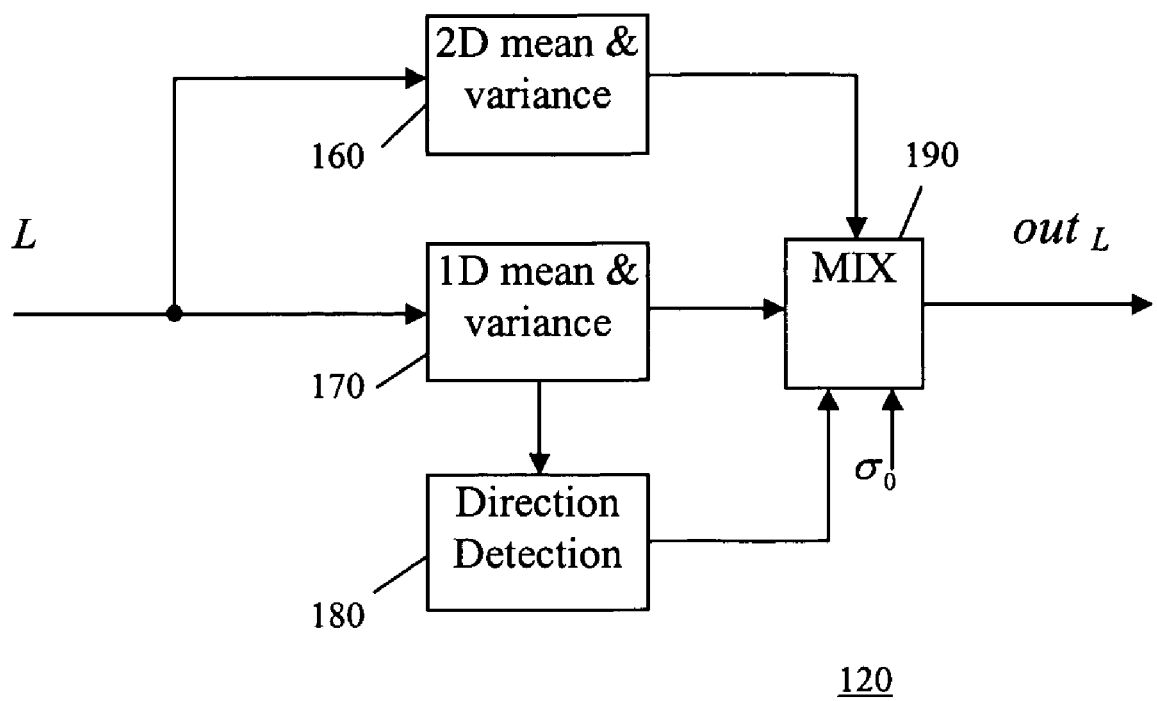
FIG. 2 shows a functional block diagram of an embodiment of the adaptive directional filter module for the low-pass signal in FIG. 1.

FIG. 2, shows a functional block diagram of an embodiment of the adaptive directional filter unit 120 for processing the low-pass signal L. The adaptive directional filter 120 is based on the estimation of the local statistics and the detection of the local structure direction. A 2D variance block 160 calculates the local 2D mean $\mu_L$, and the 2D variance $\sigma_L^2$, on a window r (i.e., $r_x \times r_y$ window of pixels, where x, y reflect window dimensions). In order to eliminate the outliers, when computing the 2D mean and the 2D variance, the minimal and the maximal pixel values within the window are not used.

A 1D variance block 170 calculates the 1D mean and the 1D variance values. The 1D mean values $\mu[k]$ and the 1D variances $\sigma[k]^2$, (k=0, 1, 2, 3), are computed for four directions: horizontal, vertical, and the two diagonal directions for the two-dimensional window of pixels. Three samples along each direction centered at the current pixel are used for computing the 1D means and the 1D variances. Based on the computed 1D variances, the direction is detected by a detection block 180 as the direction that has the smallest 1D variance.

Based on the calculated 1D means and 1D variances, the directional filtered result is computed as in relation (2) below:

$$L_{1D} = \mu[k] + \alpha(\sigma[k]^2, \sigma_0^2)\cdot(L-\mu[k]), \quad (2)$$

where k is the index corresponding to the detected direction, and $0 \leq \alpha(\sigma[k]^2, \sigma_0^2) < 1$ is a control function that controls the filter strength. One example choice of $\alpha(\sigma[k]^2, \sigma_0^2)$ is as in relation (3) below:

$$\alpha(\sigma[k]^2, \sigma_0^2) = \frac{\max(0, \sigma[k]^2 - s_1)}{\max(0, \sigma[k]^2 - s_1) + s_2}, \quad (3)$$

where $s_1=c_1\cdot\sigma_0^2$ and $s_2=c_2\cdot\sigma_0^2$ (where, e.g., $c_1$ and $c_2$ are empirically selected constants).

The noise reduced low-pass signal is the combination of the 2D filtered result and the 1D directional filtered result, via a mixer block 190, as in relation (4) below:

$$out_L = A\cdot L_{1D} + (1-A)\cdot\mu_L, \quad (4)$$

where A is defined as: $A=\min(t_2-t_1, \max(0, \sigma_L^2-t_1))/(t_2-t_1)$, with $t_1=\alpha_1\cdot\sigma_0^2$, and $t_2=\alpha_2\cdot\sigma_0^2$, ($\alpha_2 > \alpha_1 \geq 0$) where, e.g., $\alpha_1$ and $\alpha_2$ are empirically selected constants.

Figure 3:
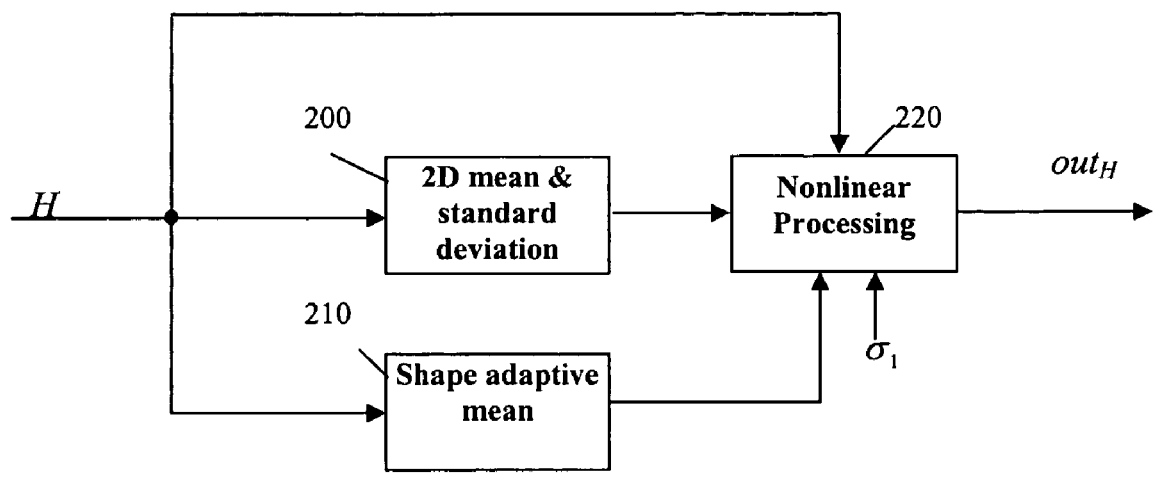
FIG. 3 shows a functional block diagram of an embodiment of the nonlinear filter module for the high-pass signal in FIG. 1.

FIG. 3 shows a functional block diagram of an embodiment of the nonlinear filter unit 140 (FIG. 1) for the high-pass signal H. First, the local 2D mean $\mu_H$ and the 2D standard deviation $\sigma_H$ are computed on a $r_x \times r_y$ window of pixels by the variance block 200. In order to eliminate the outliers, when computing the 2D mean and the 2D standard deviation, the minimal and the maximal pixel values within the window are not used.

Then, a shape adaptive mean is computed on a smaller window (i.e., $r_1 \times r_2$ window with $r_1 < r_x$ and $r_2 < r_y$) by a shape adaptive mean block 210, as in relation (5) below:

$$\mu_S = \left(\sum_{i,j} w_{ij}\cdot H(x+i, y+j)\right) \bigg/ \left(\sum_{i,j} w_{ij}\right), \quad (5)$$

where i, j are pixel indices; x, y are current pixel coordinates, and $$w_{ij} = \begin{cases} 1, & \text{if } |H(x+i, y+j) - H(x, y)| \leq \sigma_1; \\ 1/2, & \text{if } \sigma_1 < |H(x+i, y+j) - H(x, y)| \leq 2\sigma_1; \\ 1/4, & \text{if } 2\sigma_1 < |H(x+i, y+j) - H(x, y)| \leq 3\sigma_1; \\ 0, & \text{otherwise.} \end{cases}$$

The high-pass signal H is then processed by a nonlinear processing block 220 based on the calculated 2D standard deviation $\sigma_H$, the shape adaptive mean $\mu_s$, and the high-pass channel noise level $\sigma_1$. The nonlinear procedure first checks the 2D standard deviation.

If the 2D standard deviation is small, the high-pass channel output $out_H$ is set to 0. If the 2D standard deviation is large, then a sub-procedure (described further below) is utilized to process the high-pass signal H using the shape adaptive mean $\mu_s$. If the value of the 2D standard deviation is in the middle range, then the high-pass signal H is scaled down and provided as the high-pass channel output $out_H$.

In one embodiment, the above-mentioned sub-procedure that uses the shape adaptive mean $\mu_s$ is implemented as follows. If the absolute value of the shape adaptive mean $\mu_s$ is small, the high-pass channel output $out_H$ is set to 0; if the absolute value of the shape adaptive mean $\mu_s$ is large, the high-pass channel output $out_H$ is set equal to the shape adaptive mean; if the absolute value of the shape adaptive mean $\mu_s$ is in the middle range, then the shape adaptive mean $\mu_s$ is scaled down and set as the high-pass channel output $out_H$.

For the nonlinear block 220, an example embodiment of the above nonlinear processing for the high-pass channel is implemented as described by the example pseudo-code segment (6) below:

(6)
```
if(σ_H ≤ q_1)
    out_H = 0;
else if(σ_H ≥ q_2)
{
    if(|μ_S| < qq_1)
        out_H = 0;
    else if(|μ_S| ≥ qq_2)
        out_H = μ_S;
    else
        out_H = μ_S · (|μ_S| − qq_1)/(qq_2 − qq_1);
}
```

-continued $$\text{else}$$
$$out_H = H \cdot (\sigma_H - q_1)/(q_2 - q_1);$$

where $q_1 = b_1 \cdot \sigma_1$, $q_2 = b_2 \cdot \sigma_1$ with $b_2 > b_1 \geq 0$, and $qq_1 = bb_1 \cdot \sigma_1$, $qq_2 = bb_2 \cdot \sigma_1$ with $bb_2 > bb_1 \geq 0$ (where, e.g., $b_1$, $b_2$, $bb_1$, $bb_2$ are empirically selected constants).

The final output Z of the system 100 (FIG. 1) is the summation of the processed results for the two channels, as in relation (7) below:

$$Z = out_L + out_H. \qquad (7)$$

The process not only preserves details of the input image, but also provides essentially clean, smooth, and natural looking homogeneous regions in the output image Z.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for reducing noise in video image signals, comprising the steps of:
   splitting an input video image signal into a low-pass channel signal and a high-pass channel signal;
   processing the low-pass signal by adaptive directional filtering
   processing the high-pass channel signal by nonlinear filtering;
   combining the processed low-pass signal and the processed high-pass signal to obtain a noise-reduced output image;
   estimating the local image statistics;
   wherein the step of processing the low-pass signal further includes the steps of processing the low-pass signal by adaptive directional filtering based on the estimated local image statistics and the noise level of the low-pass channel, and the step of processing the low-pass signal by adaptive directional filtering further includes the steps of:
   computing the local 2D and 1D statistics;
   detecting the local image structure direction;
   generating a 1D adaptive directional filter using the calculated 1D statistics and the low-pass channel noise level; and
   obtaining a 2D filtered result from the low-pass signal using the 2D statistics;
   obtaining a 1D adaptive directional filtered result from the from the low-pass signal using the 1D adaptive directional filter; and
   combining the 2D mean result and the 1D adaptive directional filter result to obtain the processed low-pass channel output signal.

2. The method of claim 1 further comprising the steps of:
   estimating the local image statistics;
   wherein the step of processing the low-pass signal further includes the steps of processing the low-pass signal by adaptive directional filtering based on the estimated local image statistics and the noise level of the low-pass channel.

3. The method of claim 2 wherein the step of estimating the local image statistics further includes the steps of: estimating the local image 2D statistics, and estimating the local image 1D statistics.

4. The method of claim 2 further comprising the steps of:
   estimating the local image structure direction;
   wherein the step of processing the low-pass signal further includes the steps of processing the low-pass signal by adaptive directional filtering based on the estimated local image statistics, the local image structure direction and the noise level of the low-pass channel.

5. The method of claim 1 further comprising the steps of:
   estimating the local image statistics;
   wherein the steps of processing the high-pass channel signal further includes the steps of processing the high-pass channel signal by nonlinear filtering based on the estimated local statistics and the noise level of the high-pass channel.

6. The method of claim 5 further comprising the steps of:
   estimating the noise level of the high-pass channel;
   wherein the steps of processing the high-pass channel signal further includes the steps of processing the high-pass channel signal by nonlinear filtering based on the estimated local statistics and the noise level of the high-pass channel.

7. The method of claim 6 wherein the step of estimating the channel noise levels further includes the steps of calculating the high-pass channel noise level as a function of the input signal noise level.

8. The method of claim 6 wherein the step of estimating the channel noise levels further includes the steps of calculating the high-pass channel noise level $\sigma_1$ as a function of the input signal noise level $\sigma_n$ and the splitting filter: $\sigma_1 = f_1(\sigma_n)$.

9. The method of claim 8 wherein $\sigma_1 = 0.7 \cdot \sigma_n$.

10. The method of claim 1 wherein the step of splitting the input signal further includes the steps of:
    applying a splitting filter to the input signal to obtain the low-pass channel signal; and
    subtracting the low-pass channel signal from the input signal to obtain the high-pass channel signal.

11. The method of claim 10 wherein the splitting filter is selected such that high-pass channel signal includes noise and significant image structures.

12. The method of claim 10, wherein the splitting filter $g_0$ is defined as:

$$g_0 = \begin{bmatrix} 1/12 & 1/12 & 1/12 \\ 1/12 & 1/3 & 1/12 \\ 1/12 & 1/12 & 1/12 \end{bmatrix}.$$

13. The method of claim 1 wherein the step of estimating the channel noise levels further includes the steps of calculating the low-pass channel noise level as a function of the input signal noise level.

14. The method of claim 1 wherein the step of estimating the channel noise levels further includes the steps of calculating the low-pass channel noise level $\sigma_0$ as a function of the input signal noise level $\sigma_n$ and the splitting filter: $\sigma_0 = f_0(\sigma_n)$.

15. The method of claim 14 wherein $\sigma_0 = 0.4 \cdot \sigma_n$.

16. The method of claim 1, wherein the step of processing the low-pass signal by adaptive directional filtering at a current image pixel further includes the steps of:
   computing the 2D mean $\mu_L$ and the 2D variance $\sigma_L^2$ on a $r_x \times r_y$ window of the input image pixels;
   computing the 1D variances $\sigma[k]^2$ (k=0, 1, 2, 3) for horizontal, vertical, and two diagonal directions in the window using three pixel samples along each direction centered at the current pixel;
   determining the local direction by finding the direction that has the smallest 1D variance;
   generating the 1D directional filter as:
   $$L_{1D} = \mu[k] + \alpha(\sigma[k]^2, \sigma_0^2) \cdot (L - \mu[k]),$$
   where k is the index corresponding to the detected direction, $0 \leq \alpha(\sigma[k]^2, \sigma_0^2) < 1$ is a control function that controls the filter strength, and $\sigma_0$ is the noise level of the low-pass channel signal; and
   combining the 2D filtered result $\mu_L$, and the 1D directional filtered result $L_{1D}$, as:
   $$out_L = A \cdot L_{1D} + (1-A) \cdot \mu_L,$$
   where A is defined as: $A = \min(t_2 - t_1, \max(0, \sigma_L^2 - t_1))/(t_2 - t_1)$, with $t_1 = \alpha_1 \cdot \sigma_0^2$, $t_2 = \alpha_2 \cdot \sigma_0^2$, constants $\alpha_2 > \alpha_1 \geq 0$.

17. The method of claim 16, wherein the step of generating the 1D directional filter further includes suing the control function $$\alpha(\sigma[k]^2, \sigma_0^2) = \frac{\max(0, \sigma[k]^2 - s_1)}{\max(0, \sigma[k]^2 - s_1) + s_2},$$

where
   $s_1 = c_1 \cdot \sigma_0^2$ and $s_2 = c_2 \cdot \sigma_0^2$, with constants $c_1$ and $c_2$.

18. The method of claim 17, wherein the step of processing the high-pass signal using a nonlinear filter includes the steps of:
   estimating the noise level of the high-pass channel;
   computing the 2D mean $\mu_H$ and the 2D standard deviation $\sigma_H$ on the $r_x \times r_y$ window;
   computing a shape adaptive mean on a smaller window as:

$$\mu_S = \left(\sum_{i,j} w_{ij} \cdot H(x+i, y+j)\right) \bigg/ \left(\sum_{i,j} w_{ij}\right),$$

where $$w_{ij} = \begin{cases} 1, & \text{if } |H(x+i, y+j) - H(x, y)| \leq \sigma_1; \\ 1/2, & \text{if } \sigma_1 < |H(x+i, y+j) - H(x, y)| \leq 2\sigma_1; \\ 1/4, & \text{if } 2\sigma_1 < |H(x+i, y+j) - H(x, y)| \leq 3\sigma_1; \\ 0, & \text{otherwise;} \end{cases}$$

processing the high-pass signal H using the following nonlinear procedure:

```
if(σ_H ≤ q_1)
    out_H = 0.0;
```

-continued

```
else if(σ_H ≥ q_2)
{
    if(|μ_S| < qq_1)
        out_H = 0.0;
    else if(|μ_S| ≥ qq_2)
        out_H = μ_S;
    else
        out_H = μ_S · (|μ_S| - qq_1)/(qq_2 - qq_1);
}
else
    out_H = H · (σ_H - q_1)/(q_2 - q_1);
``` where $q_1 = b_1 \cdot \sigma_1$, $q_2 = b_2 \cdot \sigma_1$ with $b_2 > b_1 \geq 0$, and $qq_1 = bb_1 \cdot \sigma_1$, $qq_2 = bb_2 \cdot \sigma_1$ with $bb_2 > bb_1 \geq 0$, and $\sigma_1$ is the noise level of the high-pass signal.

19. The method of claim 1, wherein the step of processing the high-pass signal using a nonlinear filter includes the steps of:
   computing a 2D standard deviation;
   computing a shape adaptive mean;
   if the 2D standard deviation is less than a first value, outputting essentially 0 as the high-pass signal processing output;
   if the 2D standard deviation is larger than a second value higher than the first value, then sub-processing the high-pass signal using a shape adaptive mean to generate the high-pass signal processing output; and
   if the 2D standard deviation is between the first and second values, then scaling down the high-pass signal as the high-pass signal processing output.

20. The method of claim 19, wherein the sub-processing step using the shape adaptive mean, further includes the steps of:
   if the absolute value of the shape adaptive mean is less than a third value, outputting essentially 0 as the high-pass signal processing output;
   if the absolute value of the shape adaptive mean is larger than a fourth value higher than the third value, outputting the shape adaptive mean as the high-pass signal processing output; and
   if the absolute value of the shape adaptive mean is between the third and fourth values, then scaling down the shape adaptive mean as the high-pass signal processing output.

21. The method of claim 1, wherein switching between 2D filtering and 1D filtering is based on local image 2D and 1D statistics and noise level of the low-pass channel.

22. A video image noise reduction system, comprising:
   a splitter that splits an input video image signal into a low-pass channel signal and a high-pass channel signal;
   a low-pass signal processor that processes the low-pass signal by adaptive directional filtering;
   a high-pass signal processor that processes the high-pass channel signal by nonlinear filtering;
   a combiner that combines the processed low-pass signal and the processed high-pass signal to obtain a noise-reduced output image;
   a noise estimator that estimates the channel noise levels for the low-pass channel;
   such that the low-pass signal processor further processes the low-pass signal by adaptive directional filtering based on the noise level of the low-pass channel, wherein the low-pass signal processor further processes the low-pass signal by;

computing the local 2D and 1D statistics;

detecting the local image structure direction; generating a 1D adaptive directional filter using the calculated 1D statistics and the low-pass channel noise level; and obtaining a 2D filtered result from the low-pass signal using the 2D statistics;

obtaining a 1D adaptive directional filtered result from the from the low-pass signal using the 1D adaptive directional filter; and combining the 2D mean result and the 1D adaptive directional filter result to obtain the processed low-pass channel output signal.

23. The system of claim 22 further comprising:

a statistics estimator that estimates the local image statistics;

such that the low-pass signal processor further processes the low-pass signal by adaptive directional filtering based on the estimated local image statistics and the noise level of the low-pass channel.

24. The system of claim 23 wherein the statistics estimator estimates the local image statistics by estimating the local image 2D statistics, and estimating the local image 1D statistics.

25. The system of claim 23 further comprising:

a direction estimator that estimates the local image structure direction;

such that the low-pass signal processor farther processes the low-pass signal by adaptive directional filtering based on the estimated local image statistics, the local image structure direction and the noise level of the low-pass channel.

26. The system of claim 22 further comprising:

a statistics estimator that estimates the local image statistics;

such that the high-pass signal processor further processes the high-pass channel signal by nonlinear filtering based on the estimated local statistics and the noise level of the high-pass channel.

27. The system of claim 26 further comprising:

a noise level estimator that estimates the noise level of the high-pass channel;

such that the high-pass signal processor further processes the high-pass channel signal by nonlinear filtering based on the estimated local statistics and the noise level of the high-pass channel.

28. The system of claim 22 wherein:

the splitter comprises a splitting filter that generates the low-pass channel signal from the input signal;

the system further comprises a subtractor that subtracts the low-pass channel signal from the input signal to obtain the high-pass channel signal.

29. The system of claim 28 wherein the high-pass channel signal includes noise and significant image structures.

30. The system of claim 22 wherein the high-pass signal processor further processes the high-pass signal by:

computing a 2D standard deviation;

computing a shape adaptive mean;

if the 2D standard deviation is less than a first value, outputting essentially 0 as the high-pass signal processing output;

if the 2D standard deviation is larger than a second value higher than the first value, then a sub-processor processes the high-pass signal using a shape adaptive mean to generate the high-pass signal processing output; and if the 2D standard deviation is between the first and second values, then scaling down the high-pass signal as the high-pass signal processing output.

31. The system of claim 30 wherein the sub-processor further processes the high-pass signal wherein:

if the absolute value of the shape adaptive mean is less than a third value, outputting essentially 0 as the high-pass signal processing output;

if the absolute value of the shape adaptive mean is larger than a fourth value higher than the third value, outputting the shape adaptive mean as the high-pass signal processing output; and if the absolute value of the shape adaptive mean is between the third and fourth values, then scaling down the shape adaptive mean as the high-pass signal processing output.

32. The system of claim 22, wherein switching between 2D filtering and 1D filtering is based on local image 2D and 1D statistics and noise level of the low-pass channel.

* * * * *